INVENTOR.
ROBERT I. JAFFEE
BY Robert O. Richardson
ATTORNEY

INVENTOR.
ROBERT I. JAFFEE
BY Robert O. Richardson
ATTORNEY

INVENTOR.
ROBERT I. JAFFEE
BY Robert O. Richardson
- ATTORNEY -

INVENTOR.
ROBERT I. JAFFEE
BY Robert O. Richardson
ATTORNEY

United States Patent Office 3,427,706

Patented Feb. 18, 1969

3,427,706

SANDWICH STRUCTURES AND METHOD

Robert I. Jaffee, Columbus, Ohio, assignor, by mesne assignments, to Douglas Aircraft Company, Inc., Santa Monica, Calif., a corporation of Delaware Filed Nov. 13, 1964, Ser. No. 410,971
U.S. Cl. 29—471.1 8 Claims
Int. Cl. B23k *31/02;* B23p *17/00*

This invention relates to sandwich structures and preferred methods of fabrication. More particularly this invention relates to diffusion bonded metallic sandwich structures formed by a roll-welding process.

One of the best composite structures with a high strength-to-weight ratio is a sandwich structure having an internal element or core and one or more facing materials. When one facing material is used, it is reinforced by the core and when two opposing facing materials are used, the core reinforces and maintains the materials in spaced relationship. As used in the description of this invention, sandwich structures mean both types as well as various types of core elements per se.

The chief problem in the fabrication of sandwich structures is the development of a strong bond between the cover sheets and the internal component. Adhesive bonding, brazing and welding are used, depending upon the surface conditions and the desired end use. Adhesive bonding has a disadvantage in that it can be used only when the assembly is to be used at relatively low temperatures. Brazing has the deficiency that brazed joints are difficult to prepare and the resulting joint efficiency is generally very low. Welding of sandwich structures is generally done by spot or resistance-welding techniques, both of which are time-consuming and costly operations. Many materials which are otherwise ductile become brittle when welded and cannot be used in welded assemblies.

One solution to the problem of developing light weight, high strength structures is disclosed in applicant's patent, No. 3,044,160 issuing July 17, 1962 for Method of Producing Ribbed Metal Sandwich Structures. Therein is disclosed a new method of joining facing materials to ribbed cores by roll bonding. This method provides a continuous solid state bond between the facing materials and the ribs at a considerable reduction in cost. The process is basically simple. Alternate sheets of rib material and filler material are hot rolled between two sheets of the cover material. The cover material and rib material become integrally bonded and the filler material is then removed. The cover and rib material may be of such corrosion-resistant metals as stainless steels, aluminum, titanium and titanium alloys, nickel and nickel alloys, tantalum, molybdenum and columbium, to name but a few. The spacer material may be selected from such readily removable metals as copper, mild steel, or others.

In the past, the process had two limitations. The direction of rolling was required to be in a direction parallel to the direction of the ribs and the rolling pressure applied had to have a component normal to the plane of the surfaces bonded.

The present inpention is based upon the recent discovery that the foregoing limitations do not apply and that as a consequence new configurations of structures are now possible, using roll-bonding techniques somewhat similar to those described in the above-mentioned patent. In accordance with the present invention, stiffened skin structures and individual sections of reinforcement elements, such as I-beams, L-beams, C-beams and H-beams for example, may be fabricated. Truss core, rectangular cell and hexagonal cell honeycomb sandwich structures may be made in addition to the prior structures having bonding surfaces parallel to the rolling plane. Tapered configurations, keying at the rib to face joint, radial sandwich and waffle structures are other modifications.

It is therefore an object of the present invention to provide for metallic structures having a high strength-to-weight ratio.

Another object is the provision of novel reinforcing elements formed by roll-bonding techniques.

Another object is the provision of structures having a high strength-to-weight ratio, said structures being useful in an elevated temperature environment.

Another object is the the provision of structures having a high strength-to-weight ratio, said structures being of novel configuration fabricated with metal-forming techniques.

Another object is the provision of a method of autogenous welding of metallic elements to form structures having a high strength-to-weight ratio, said structures being useful in an elevated temperature environment.

Another object is the provision of a method of fabricating structures having a high strength-to-weight ratio in elevated temperature environment through the application of diffusion-bonding techniques to autogenously weld structural elements.

Another object is the provision of a method of roll-bonding adjacent elements into an autogenous weld wherein the rolling pressure may be from any direction relative to the plane of the abutting surfaces of the elements.

Other objects will become apparent as a description of the invention proceeds, having reference to the drawings wherein.

Figures 1, 2, 3, 4:
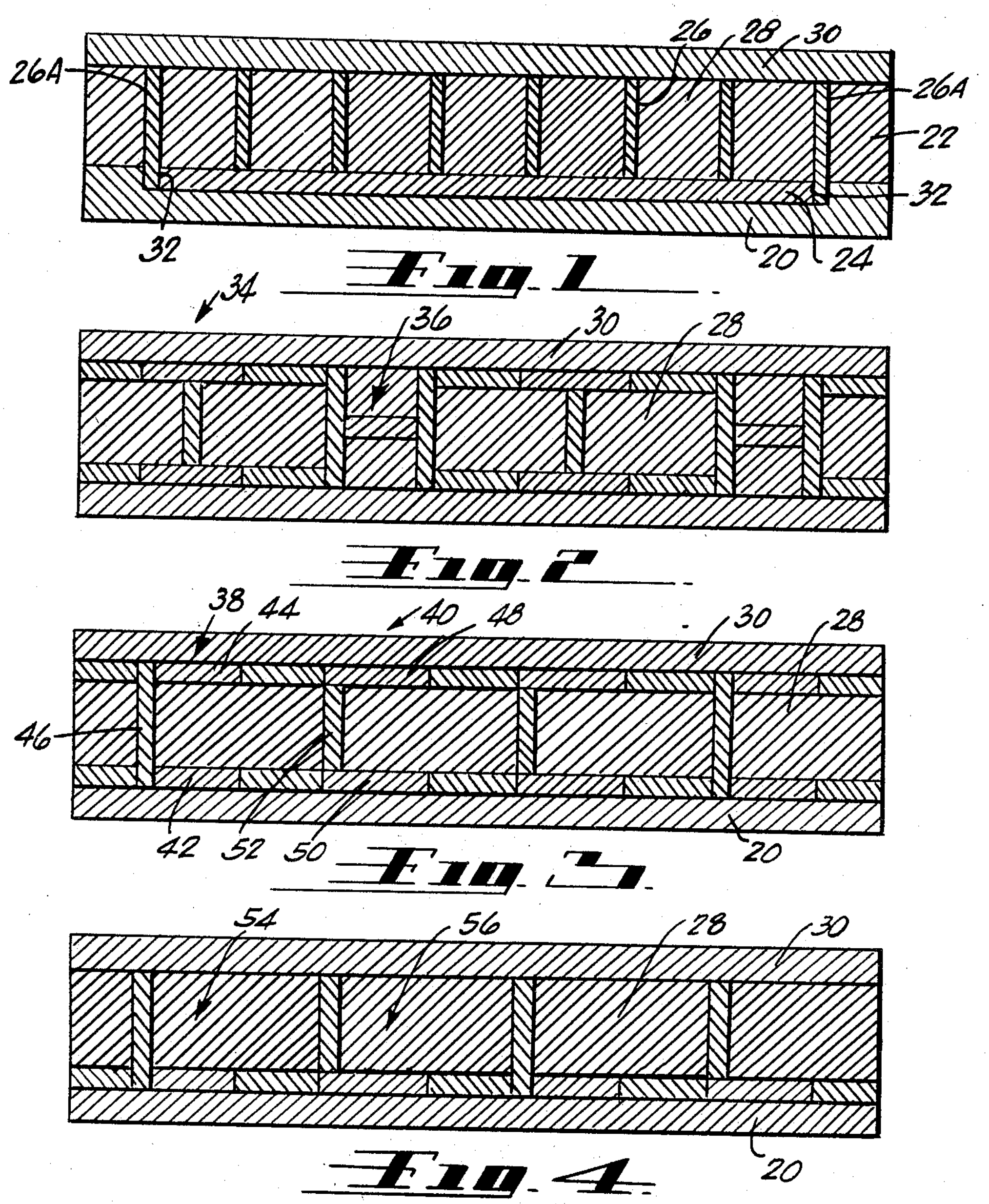
FIG. 1 is a cross-sectional view in elevation of a stiffened skin assembly before removal of the yoke, filler bars and covers.
FIG. 2 is a similar view showing I-beam and H-beam assemblies.
FIGS. 3 and 4 are similar views showing C-beam and L-beam assemblies.
Figure 17:
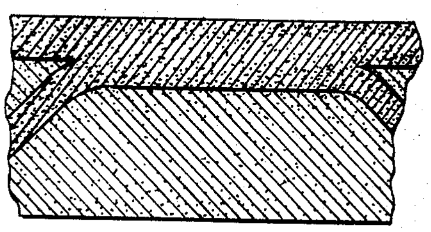
FIG. 17 is an enlarged sectional view showing the autogenous weld between two elements that have been diffusion-bonded together.

Roll welding is a new technique for providing sandwich structures which makes it practical for the first time to realize the advantages of sandwich structures, that is, high strength and stiffness combined with light weight, in many aerospace and similar applications. The three primary advantages of rolled-weld sandwich structures are in the fabrication of complex contoured surfaces, a reliable diffusion bond between the core and faces, with the properties and strength of the base metal, and low cost compared to conventional sandwich structures. The advantages make it the preferred method for such applications as pressurized fuel tanks, solid propellant engine cases, pressure vessels and space vehicle structures of many kinds.

Titanium and titanium alloys are particularly well suited to the roll-welding process, as are a variety of metals including aluminum, columbium, molybdenum and stainless steel. No special tools are required since the roll-welding process utilizes conventional techniques and equipment and is fabricated in a standard hot rolling mill. Forming is accomplished on hydro presses, brakes, and by other standard airframe manufacturing techniques.

Briefly, the roll-welding process encompasses: (1) preparing the core by abutting cut strips, corrugating or shaping to the desired configuration; (2) filling the spaces between the corrugations or ribs using filler bars of mild steel or other appropriate metal that may be removed chemically; (3) positioning the face sheets on the core and filler bar section; (4) placing the sandwich in an appropriate yoke; (5) welding the covers to the yoke to form an air tight pack; (6) evacuating the pack or back-filling with a suitably inert gas to protect against oxidation and contamination; (7) hot rolling the pack in the same manner as a single metal plate to the desired reduction in thickness. Diffusion bonding is accomplished in the same operation; (8) contouring the pack, if contouring is required, by appropriate hot or cold rolling or other forming process; (9) removing the covers mechanically; (10) removing the filler bars chemically, leaching with dilute nitric or other appropriate acid.

The roll-welding process utilizes heat and pressure to produce a true diffusion bond or autogenous weld between the core and the faces of the sandwich. Thus the interfaces are diffused together and the resulting bond itself has the properties and the strength of the base metal. Proper welding occurs at pressures such that there is a reduction in thickness of about 20% to 30% or more for selected titanium alloys. This feature of rolled welding effects cost savings in two ways (1) the cost of fabrication and assembly of the roll-welding pack remains constant even at a ten to twenty times increase in the length, and this area, of the finished sandwich compared to its orginal length as assembled; (2) heavy gauge sheet stock costs less than light gauge, pound for pound, and by using the less expensive raw stock light gauge, finished panels can be produced less expensively.

All the elements of the roll-welding pack, that is, the faces, core, filler bars, yoke and covers, are diffusion bonded into an integral unit that can be formed in much the same manner as a solid metal plate. Usually the yoke is removed prior to forming and the yoke covers are left in place to protect the sandwich faces. Thus, normal forming operation techniques such as hot rolling, cold rolling, hydroforming, braking and so forth can be utilized without any special equipment or tooling. Any forming or contouring that can be utilized for plate or sheet metal can be utilized for roll-welded sandwich panels of the same metal and gauge. Cylinders, spheres, domes and an almost endless variety of contoured shapes can be formed.

The only limitation to panel length appears to be the space available in front of and behind the rolling mill, e.g., the position of the preheat furnace and run-out table. The only limitation to panel width appears to be the width of the rolling mill, and it is recognized that mills over 200 inches wide are in commercial operation. Panels 3 feet wide and 6 feet long are quite convenient to handle.

The yoke is removed mechanically after the roll-welding operation but before the forming operation. Usually the yoke covers are left in place to protect the sandwich faces during the forming operations and are then stripped mechanically. The filler bars are then removed after all other processing is completed. Mechanical removal of filler bars is feasible in flat panels and in other configurations. Selective removal is accomplished by leaching in a chemical such as dilute nitric acid. For parts with a great corrugation length, the leaching acid should be pumped into the core and circulated through an appropriate manifold device. Large panels with filler bars of mild steel can be leached at about two inches per hour. The estimated cost of leaching titanium panels is based mainly upon acid consumption. In a particular case involving nitric acid this cost amounted to approximately thirty percent of the total production cost.

Inserts such as stiffeners, supports, edge members or joining elements can be placed in the pack and welded in position in the one roll-welding operation.

Protecting the sandwich elements from oxidation and contamination during roll-welding is an important element in successful roll-welding. Accordingly the yoke and covers are welded into an air tight unit and the air is removed. This permits roll welding at the required elevated temperatures without the need of special atmosphere furnaces. To accomplish the evacuation of air from the pack a tube is welded to the evacuation hole in the yoke. The tube is connected to a vacuum pump and the pack evacuated to a desired vacuum. The tube is then sealed by hand hammer forging.

The filler bars serve only to maintain rigidity in the core during processing. They must conform as closely as possible to the configuration of the core, and of course, must be of a material in consistency that will withstand rolling and will accept the rolling and forming operations without adversey affecting the configuration of the core. The filler bars may be of any metal that meets these requirements and can be removed by chemical leaching while the faces and cores of the sandwich are unaffected by the leaching chemical. For titanium and titanium alloy sandwiches, mild steel has proved quite satisfactory. Copper has also been used particularly with aluminum and certain aluminum alloy sandwiches. Other information of a general nature may be had from the earlier mentioned Patent No. 3,044,160. As previously noted that invention had the limitations of requiring the direction of rolling to be parallel to the direction of the ribs and the bonding faces had to be normal to the direction of the applied pressure.

Referring now to FIG. 1 there is shown a bottom yoke cover 20 upon which is positioned a yoke or frame 22. On top of the lower yoke cover 20 is a skin 24 of light gauge titanium and ribs 26 and spacers 28 to completely fill the space provided between the ends of the yoke 22. A top yoke cover 30 is positioned over the ribs, filler bars and yoke, and welded around the outer edge. The yoke 22, yoke covers 20, 30 and filler bars 28 are all of a material that is leachable, such as copper or iron for example, and the ribs 26 and skin 24 are of material, in this case titanium, that does not react to the leaching acid. All of these elements make up the roll-welding pack which is then passed through a rolling mill under heat and pressure. The rolling pressure is applied vertically and normal to the abutting surfaces of the bottom of the rib 26 with the top of the skin 24 as set forth in the earlier patent. The resulting configuration in FIG. 1 is a stiffened skin 24 having reinforcing ribs 26 on one side. There is no top skin which is called for in the earlier patent. All of the ribs 24 may be considered as being bonded to the skin in an autogenous weld in accordance with the teaching of the earlier referred to patent.

Ribs 26A, however, as a result of the present invention, is shown by the interface line 32 as abutting the ends of skin 24 so that the planes of the abutting faces are vertical. This is contrary to the teaching of the above-identified patent. It has been found that, in accordance with the present invention, the vertical pressure applied by the rolling mill exerts a hydrostatic pressure within the pack in all directions, and that an autogenous weld of a vertical interface may result from a vertically applied pressure. For best results a higher temperature is desirable, such as heat within the range of 1650 degrees to 1800 degrees Fahrenheit in the case of titanium materials.

FIGS. 2, 3 and 4 are other examples of structural reinforcing elements formed by an autogenous weld between two members, some of which have weld surfaces parallel to the direction of the applied pressure, and others which have a weld interface normal to the applied pressure. Thus, in FIG. 2 is shown both I and H beams 34 and 36. In FIG. 3 is shown C beams 38 and 40 wherein the top and bottom members abut the upper and lower edge of the vertical member 46 in beam 38. In beam 40 the upper and lower members 48 and 50 have the vertical member 52 positioned in abutting relation near the edge with their inner surfaces. The L beam configurations 54 and 56 in FIG. 4 are similarly fabricated with vertical and horizontal interfaces.

Figure 5:
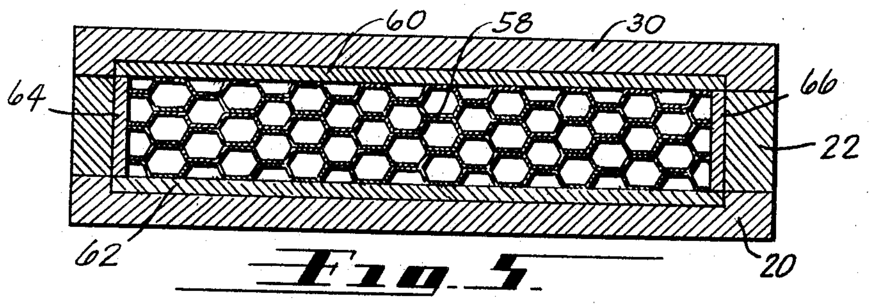
FIG. 5 is a similar view showing a multi-ply hex-celled sandwich assembly fabricated from corrugated sheets.
Figure 5A:
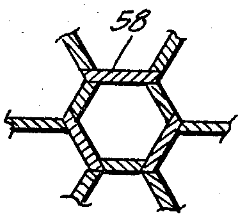
FIG. 5A is an enlarged view showing several possible types of hex-celled construction.

In FIG. 5 there is shown a multi-ply hexagonal celled sandwich construction fabricated from corrugated sheets 58. Other possible types of strips comprising the cellular core abut each other in other different ways, some of which are shown in FIG. 5A. Covers 60 and 62 and ends 64 and 66 complete the sandwich construction although they may be omitted if desired. Since, in accordance with the practice of the present invention, the direction of the plane of the interfaces between the two elements to be bonded relative to the direction of the externally applied pressure is of little consequence, each of the abutting relationships shown results in an autogenous weld in the roll-welding process.

Figure 6:
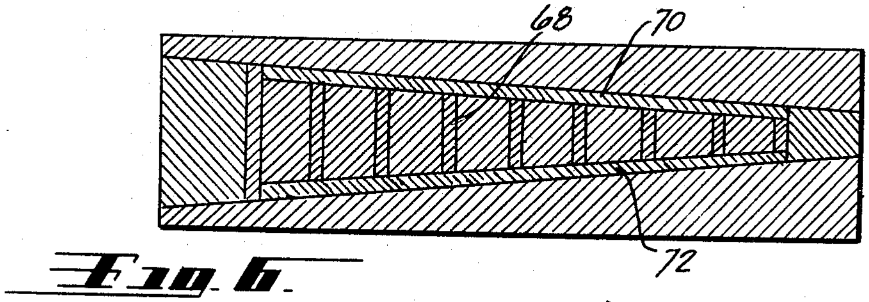
FIG. 6 is a view similar to FIG. 1 showing a transverse tapered vertical rib sandwich assembly.

FIG. 6 is a sectional end view wherein vertical ribs 68 are used between transversely tapered upper and lower cover sheets 70 and 72. In addition to having a transverse taper configuration, as shown, the ribs 68 themselves may also be tapered longitudinally to provide a longitudinal tapered sandwich construction if desired.

Figure 7:
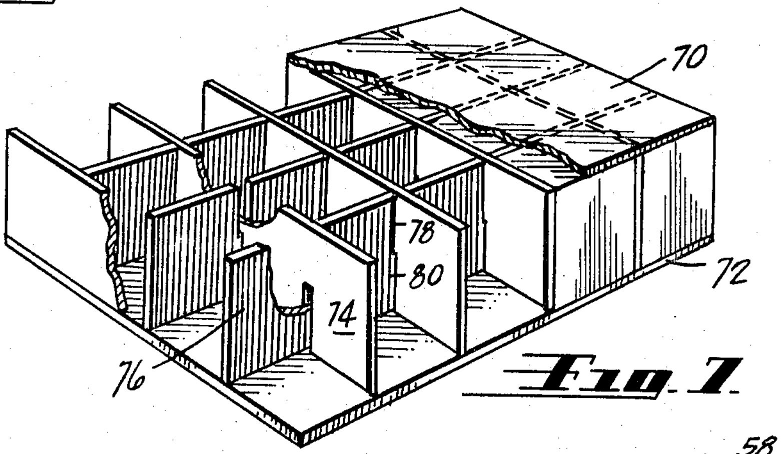
FIG. 7 is a perspective view with parts broken away showing a waffle-stiffened or egg-crate type of sandwich assembly with some of the filller material removed.
Figure 8:
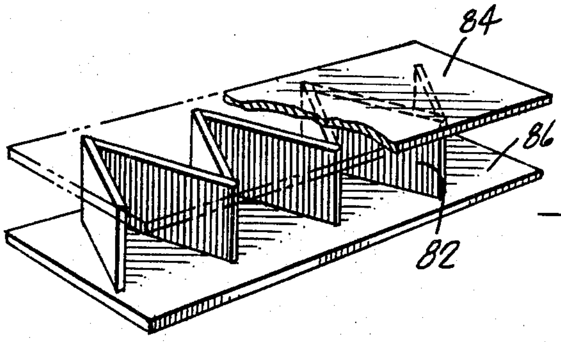
FIG. 8 is a similar view showing a sandwich assembly having a zig-zag beam core with the filler material removed.
Figure 9:
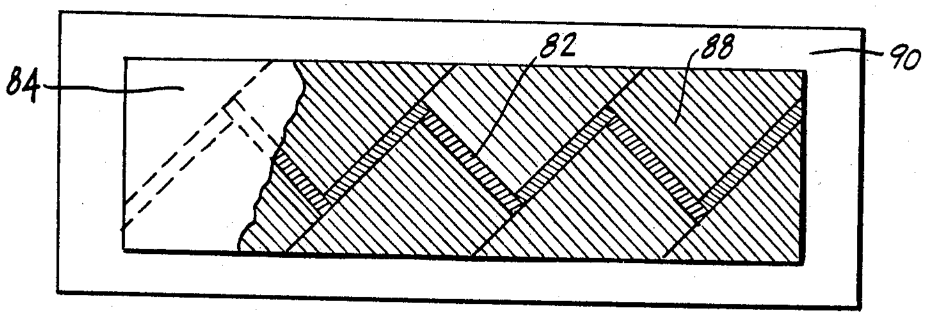
FIG. 9 is a plan view with parts broken away showing the zig-zag beam core and face plate prior to removal of the filler-bars, yoke, and cover.

In FIG. 7 there is shown a waffle stiffened skin having covers 70 and 72 with intermediate ribs 74 and 76 assembled in egg crate fashion. The longitudinal and transverse ribs 74 and 76 have cooperating notches 78 and 80 whereby the ribs may be interfitted. In FIG. 8 there is shown a zig zag beam 82 between upper and lower cover sheets 84 and 86. This beam consists of a plurality of plates angularly disposed relative to each other, and their vertical abutting edges become bonded during the same roll-welding process in which their horizontal edges are bonded to the inner surface of the upper and lower cover sheets. FIG. 9 is a plan view with parts broken away to show beam 82 with filler bars 88 of leachable material filling the interior of yoke 90. Alternatively, the beam 82 may comprise a single piece of metal corrugated to conform to the zig zag shape. The cover sheet or skin 84 may or may not extend completely across this area between the yoke sides as desired.

Figure 10:
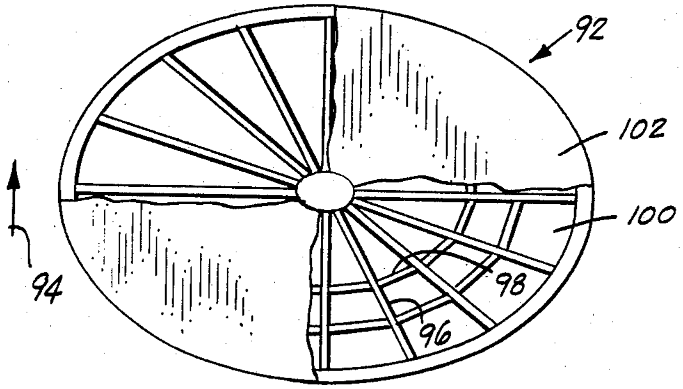
FIG. 10 is a similar view of a radially-ribbed circularly-reinforced sandwich assembly as seen before the rolling operation.

The elliptical configuration 92 shown in FIG. 10 takes advantage of unidirectional rolling to transform the elliptical configuration to that of a circle. By rolling in the direction of the arrow 94 the pack becomes elongated. As the thickness is diminished the ellipse is transformed into a perfect circle. The radial ribs 96 and the elliptical sections 98 between the ribs, as well as the top and bottom covers 100 and 102, are all welded together into an autogenous weld although the abutting surfaces of the elements to be bonded do not have a component normal to the direction of applied pressure nor are the ribs parallel to the direction of movement in the rolling process, shown by arrow 94. Thus, the limitations in the method described by my earlier patent no longer limit the type of configurations now possible. It has also been demonstrated that rolling in more than one direction is permitted while still retaining the excellent character of the autogenous welds. Thus, a circular, radial-ribbed structure can be made from a circular pack layup design by cross-rolling, as well as by unidirectional rolling of an elliptical pack as pictured in FIG. 10.

Figure 11:
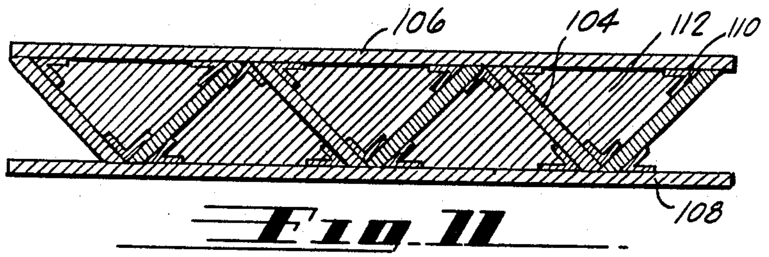
FIGS. 11 to 15 are cross-sectional views showing alternate forms of sandwich configuration.
Figure 12:
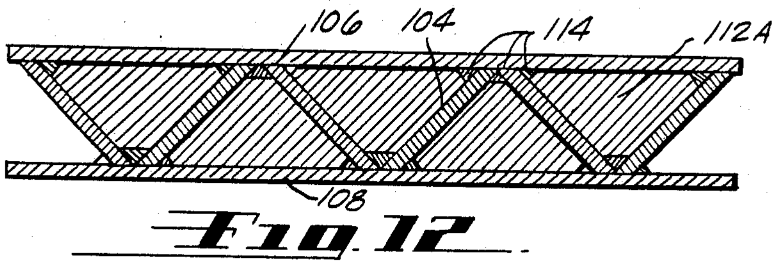
Figure 13:
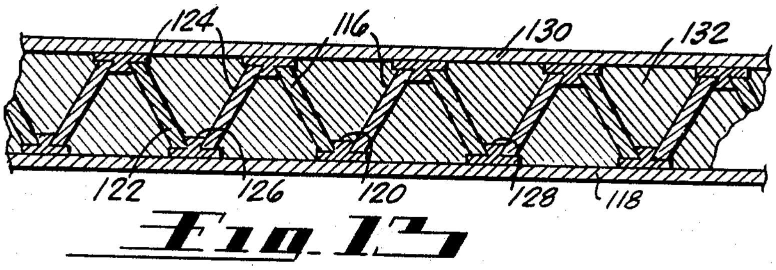

FIGS. 11 to 15 show the application of inserts to thereby provide a greater bonding surface between the adjacent elements such as the ribs 104 and face sheets 106 and 108. As shown in FIG. 11 the ribs 104 are approximately at a 45 degree angle and channel inserts 110 of titanium foil are held in position at points of contact of ribs 104 with the filler bars 112. The titanium foil inserts 110 in FIG. 11 may be simply folded around the edges of the filler bars 112 at the time of their installation to separate and hold the ribs 104 in position. The filler bars 112A in FIG. 12 have their edges removed to permit triangular inserts 114 of titanium to be inserted between the ribs 104 and the face sheet 106 in the manner shown. This provides a much larger bonding surface area with the resultant strength. There are several modifications of the use of slotted inserts shown in FIG. 13 wherein some instances the lower edge of the ribs 116 are in abutment with the upper surface of the face sheet 118 with a triangular insert 120 between adjacent ribs, much in the same manner as shown in FIG. 12. In another modification a flat insert strip 122 is positioned on the base sheet 118 and the ribs 124 are placed in contact with the insert 122 and spaced apart by a second flat insert 126. In another modification the smaller and larger inserts are integral and become a slotted insert 128.

Figure 14:
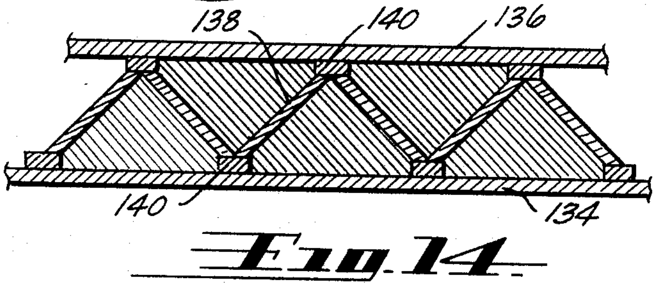
Figure 15:
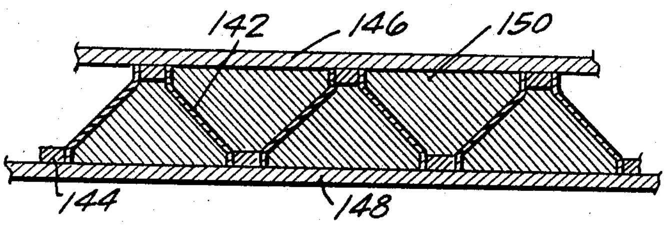

In FIG. 14 base and top sheets 134 and 136 are spaced apart by ribs 138. These ribs may be interconnecting strips or plates extending throughout the width of the sheets. Flat insert strips 140 extend along the inner surfaces of sheets 134 and 136 for reinforcing support, provide a broader contact surface with the sheets and prevent the sheets from shifting laterally relative to the ribs. In FIG. 15 strips 142 are bent at their ends to abut the sides of insert strips 144. When roll-bonded under external pressure exerted normal to the planes of sheets 146 and 148, these sheets, strips 142 and inserts 144 become united in an autogenous weld as lateral and tranverse pressure is applied through filler material 150.

In view of the fact that when the roll-bonding process is completed they all become autogenous welds with the ribs and face sheets, the use of various types of inserts become a matter of choice or a matter of convenience and cost in production, it being noted that they all may be used as a result of the present invention.

Figure 16:
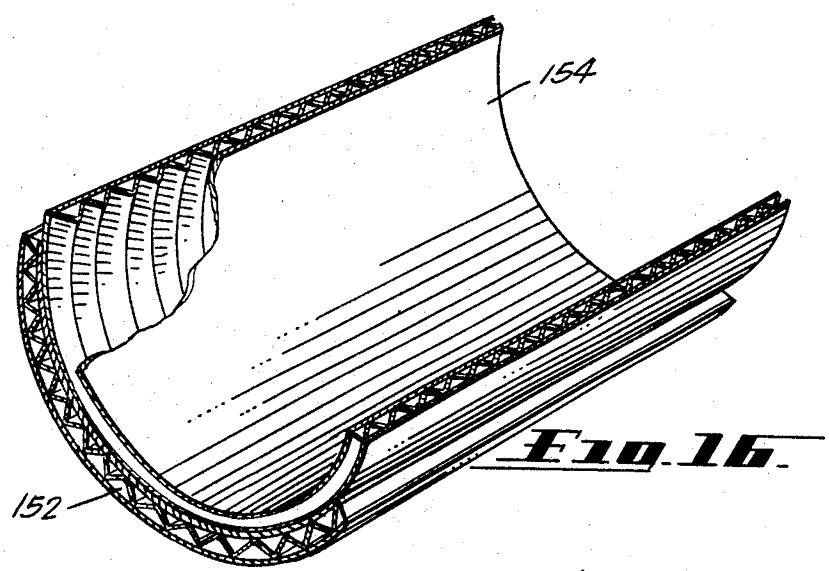
FIG. 16 is a perspective view of finished panels contoured parallel to and normal to the ribs of the inner core.

After the ribs and face sheets have become welded together and before the spacer or filler bars are removed, the yoke and cover plates may be mechanically stripped from the pack and thereafter the pack treated as an integral sheet of material. Thus as shown in FIG. 16 the pack may have curvatures made with their axis of curvature parallel with the direction of the ribs as shown in sandwich 152 or it may be at right angles thereto as shown in sandwich 154. Thereafter the spacer or filler bars may be leached from the pack in a manner earlier described.

It will be appreciated that whereas only a few forms of the invention and typical applications thereof have been illustrated and described in detail herein, various changes may be made therein without departing from the spirit of the invention or the scope of the accompanying claims.

I claim:

1. The method of autogenous welding comprising the steps of:

assembling a configuration of parts with surface portions to be joined in abutting relationship in a yoke;
filling the yoke around said configuration of parts with a spacer material of chemically leachable characteristics;
covering said yoke to seal said parts therein;
heating and rolling the resulting assembly by application of a force in a direction other than normal to the plane of at least one pair of said abutting surface portions to effect an autogenous weld between said abutting surface portions of said parts and the thickness of said yoke has been reduced to a selected thickness; and
chemically leaching said spacer material from around said parts.

2. The method of autogenous welding comprising the steps of:
assembling parts to be welded with surface portions to be joined in abutting relationship in a yoke;
filling the yoke with a spacer material;
sealing the yoke and withdrawing air therefrom;
heating and rolling the resulting assembly by application of a force in a direction other than normal to the plane of at least one pair of said abutting surface portions to effect an autogenous weld between abutting portions of said parts; and
selectively removing said spacer material from said parts.

3. The method of autogenous welding comprising the steps of:
assembling parts in abutting relationship in a yoke, the abutting portions defining interface planes;
filling the yoke around said parts with a spacer material yieldable under heat and pressure;
covering said yoke to seal said parts and material therein;
subjecting said yoke to heat;
applying pressure sufficient to effect substantial deformation of at least several percent of said yoke and said parts therein, from a direction other than normal to the plane of at least one pair of said abutting portions;
transmitting said pressure to said abutting portions through said yieldable spacer material to autogenously weld said portions together; and
removing said spacer material from around said parts.

4. A pack of abutting parts to be autogenously welded upon application of heat and pressure; said pack comprising:
a yoke;
parts to be welded in abutting relationship within said yoke, abutting surfaces of which define interface planes;
spacer material filling said yoke around said parts;
said spacer material having yieldable pressure transmitting characteristics when subjected to heat and pressure;
said spacer material having leachable characteristics when subjected to chemicals to which said parts are immune; and
covers sealing said parts and spacer material within said yoke;
said parts being so positioned that said planes are in non-parallel relationship.

5. A method for manufacturing ribbed sheet structures comprising:
(a) positioning metal ribs in a yoke;
(b) positioning at least one sheet of a metal capable of autogenous welding with said ribs in contacting relationship with surfaces of said ribs, defining planes of abutting surfaces of which at least one plane is non-parallel relative to the other planes;
(c) filling the voids within said yoke with complementary spacer members capable of preferential separation from said ribs and sheet;
(d) covering the assembly and sealing said yoke with top and bottom cover plates of a material capable of preferential separation from said ribs and sheet;
(e) roll welding said metal members into an integral structural shape by exterting a rolling force in a direction other than normal to at least one of said planes; and
(f) separating said cover plates and spacer members from said structural shape so as to leave a ribbed sheet and removing said sheet from within said yoke.

6. A method for manufacturing a plurality of elongated metal structural shapes comprising:
(a) assembling flat, substantially rectangular metal members into abutting realtionship defining planes of abutting surfaces of which at least one plane is non-parallel to the other planes, said members forming a plurality of shapes in spaced relationship to one another within a yoke;
(b) filling the voids within said yoke with complementary spacer members of a material capable of preferential separation from said metal;
(c) covering said assembly and sealing said yoke with top and bottom cover plates of a material capable of preferential separation from said metal;
(d) roll welding said metal members into integral structural shapes by reducing the space between said cover members through hot rolling with a force primarily exerted in a direction other than normal to at least one of said planes; and
(e) separating said cover plates and spacer members from said structural shapes and removing said structural shapes from within said yoke.

7. A method for manufacturing ribbed sheet structures having transverse as well as longitudinal ribs comprising:
(a) positioning first substantially rectangular metal ribs in spaced parallel relationship to one another in a yoke;
(b) positioning second substantially rectangular metal ribs in spaced parallel relationship in said yoke and intersecting said first ribs;
(c) filling the voids within said yoke with complementary spacer members of a material capable of preferential separation from said metal;
(e) positioning top and bottom sheets of metals capable of roll welding with said first and second ribs and contacting the top and bottom surfaces of said ribs;
(f) covering said assembly and sealing said yoke with top and bottom cover plates of a material capable of preferential separation from said metal;
(g) roll welding said metal members into an integral structural shape by reducing the distance between said cover plates through hot rolling; and
(h) separating said cover plates and spacer members from said structural shape so as to leave a ribbed sheet structure and removing said structure from within said yoke.

8. A method for making ribbed sheet structures comprising:
(a) positioning flat, substantially rectangular metal members in spaced parallel relationship to one another within a yoke so that every other member forms substantially equivalent angles other than 90° with a top sheet positioned on said yoke and other than 90° with a bottom sheet positioned on said yoke, the alternate ribs between said every other rib forming substantially opposing complementary angles with said top and bottom sheet, said ribs abutting one another along their edges, so as to form juxtapositioned V-shaped structures;
(b) filling the voids within said yoke with complementary spacer members of a material capable of preferential separation from said metal;
(c) positioning top and bottom sheets of metals capable of bonding with said juxtapositioned V-shaped structures and contacting top and bottom surfaces of said ribs;

(d) covering the assembly and sealing said yoke with top and bottom cover plates of a material capable of preferential separation from said metals;

(e) bonding said metal members into an integral structural shape by reducing the distance between said cover plates through hot rolling; and (f) separating said cover plates and spacer members from said structural shape so as to leave a ribbed sheet structure and removing said structure from within said yoke.

References Cited

UNITED STATES PATENTS

| | | | |
|---|---|---|---|
| 3,061,713 | 10/1962 | Eggert | 219—107 |
| 3,321,826 | 5/1967 | Lowy | 29—423 |

FOREIGN PATENTS

| | | |
|---|---|---|
| 228,152 | 9/1958 | Australia. |

JOHN F. CAMPBELL, *Primary Examiner.*

J. L. CLINE, *Assistant Examiner.*

U.S. Cl. X.R.

29—187.5, 423, 472.3, 497.5

PO-1050
(5/69)

UNITED STATES PATENT OFFICE
CERTIFICATE OF CORRECTION

Patent No. 3,427,706 Dated February 18, 1969

Inventor(s) Robert I. Jaffee

It is certified that error appears in the above-identified patent and that said Letters Patent are hereby corrected as shown below:

In Column 1, line 4, delete "Douglas Aircraft Company, Inc." and insert McDonnell Douglas Corporation therefor; In Column 1, line 5, delete "Delaware" and insert Maryland therefor; In Column 3, line 54, change "this" to thus.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents